United States Patent [19]

Dankwort

[11] 4,452,092

[45] Jun. 5, 1984

[54] TORQUE FEEDBACK CONTROL FOR TWO DEGREE OF FREEDOM RATE SENSOR

[75] Inventor: Rudolf C. Dankwort, Phoenix, Ariz.

[73] Assignee: Sperry Corporation, New York, N.Y.

[21] Appl. No.: 248,613

[22] Filed: Mar. 27, 1981

[51] Int. Cl.³ .............................................. G01C 19/30
[52] U.S. Cl. ..................... 74/5.46; 74/5.6 E
[58] Field of Search ................. 74/5.46, 5.47, 5.6 E, 74/5.6 D; 73/504; 318/648

[56] References Cited

U.S. PATENT DOCUMENTS

| | | | |
|---|---|---|---|
| 3,242,745 | 3/1966 | Romberg | 74/5.46 |
| 3,477,298 | 11/1969 | Howe | 74/5.6 E X |
| 4,189,948 | 2/1980 | Buckley et al. | 74/5.6 E |
| 4,212,443 | 7/1980 | Duncan et al. | 33/321 X |
| 4,222,270 | 9/1980 | Allen | 73/504 |

Primary Examiner—Rodney H. Bonck
Attorney, Agent, or Firm—Howard P. Terry

[57] ABSTRACT

In a gyroscopic reference system of the type having force rebalanced or flexure suspended gyroscope rate sensors and pulse width modulated torquer signals, undesirable transformer like coupling between the torquer coils and the pick-off coils and transformer like coupling between the torquer coils themselves causes a bias drift error. The transformer coupling and the bias drift error are alleviated or substantially eliminated by selecting the pick-off excitation frequency to be a non-integer multiple of the torquer coil frequency and by delaying the trailing edges of the pulses of the pulse width modulated torquer signals.

6 Claims, 4 Drawing Figures

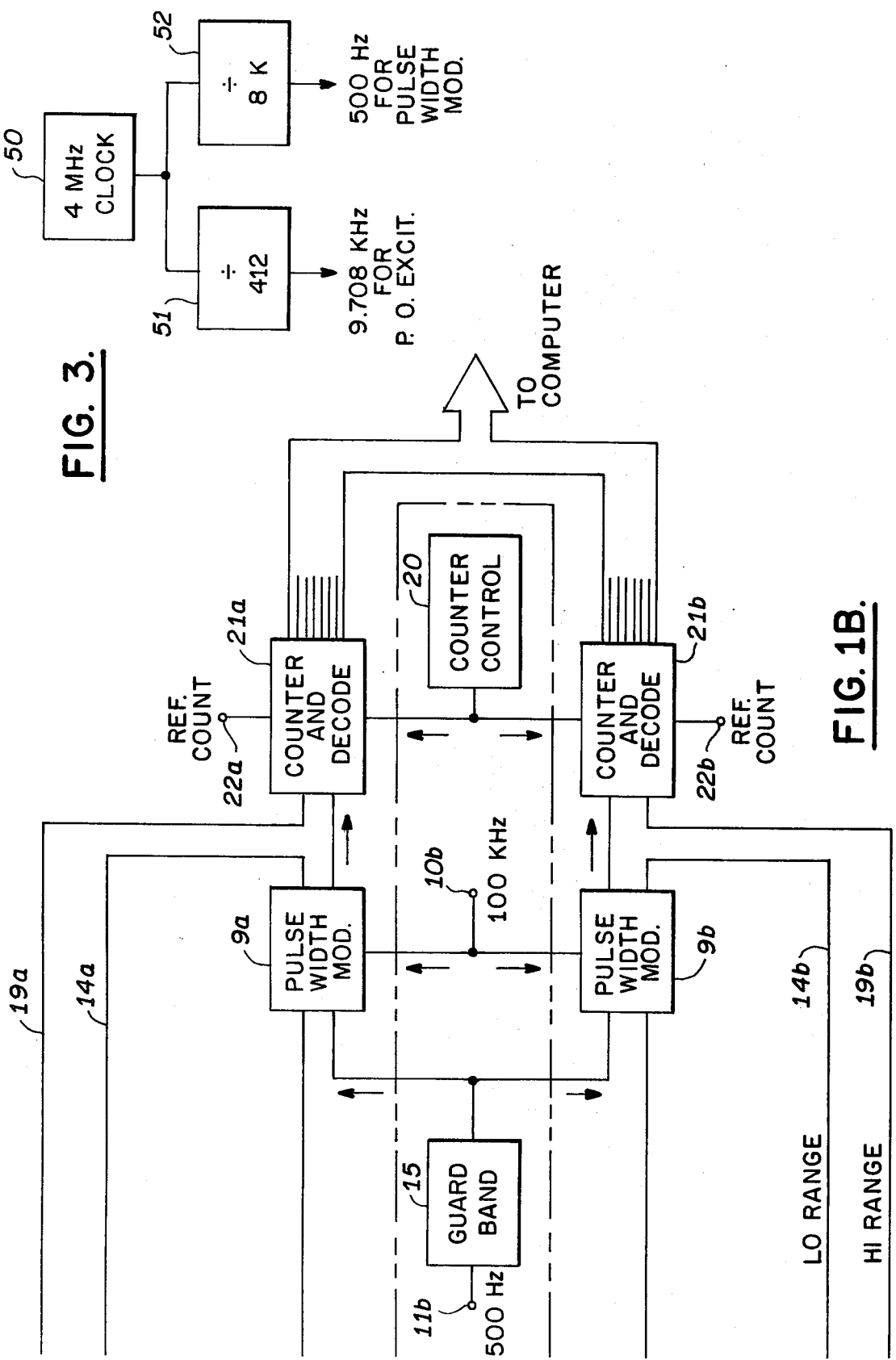

TORQUE FEEDBACK CONTROL FOR TWO DEGREE OF FREEDOM RATE SENSOR

BACKGROUND OF THE INVENTION

1. Field of the Invention

The present invention relates generally to gyroscopic reference systems of the type including a plurality of strapped down, force-rebalanced gyroscopic rate sensors for measuring craft rotation rates about primary craft axes, together with a system for computing from such measures aircraft stabilization and attitude data. A typical strapped down system is disclosed in U.S. Pat. No. 4,212,443 entitled "Strapped down Attitude and Heading Reference System for Aircraft Employing Skewed Axis Two Degree of Freedom Rate Gyros" and assigned to Sperry Corporation. More specifically, the invention related to improved torque feedback control for two degree of freedom rate sensors.

2. Description of the Prior Art

Strapped down gyroscopic inertial reference apparatus for aircraft and space vehicles is well known to those skilled in the art of gyroscopic aircraft control systems; many rate gyro configurations and control systems based thereon have been described extensively in the literature. In general, such systems include a plurality of rate sensors strapped down to the vehicle for measuring the angular velocity of the vehicle about its primary axes, which measure, along with vehicle acceleration and heading measures, is supplied to a digital computer to provide output data for use in stabilization, control, navigation, or guidance of the aircraft. Since the gyros are strapped to the airframe the rate sensors are preferably of the force or torque rebalancing type; that is, the gyro is maintained substantially aligned with its support case by feeding the gyro pick-off signal back to the gyro torquer in a manner to maintain the pick-off signal value essentially null, the torquer current so required being a measure of the rate being sensed by the rate gyro. Typical two-degree-of-freedom rate sensors of this type are disclosed in the T. R. Quermann U.S. Pat. No. 3,529,477 for a "Gyroscopic Rotor Suspension" issued Sept. 22, 1970 and in the C. G. Buckley, J. A. Kiedrowsky U.S. Pat. No. 4,189,948, issued Feb. 26, 1980 for a "Permanent Magnet Torquer for Free Rotor Flexure Suspended Gyroscopes", both inventions being assigned to Sperry Corporation. It will be appreciated that the ultimate output of the gyroscopic rate sensor must be compatible with the requirements of available digital computer techniques.

An apparatus for making the output of the gyroscopic rate sensor compatible with digital computers is disclosed in U.S. Pat. No. 4,222,270, by Arnold R. Allen, entitled "Gyroscope Rate Range Switching and Control System", issued Sept. 16, 1980, and assigned to Sperry Corporation. The Allen patent discloses a pulse width modulation type of analog-to-digital conversion apparatus useful in strapped down inertial gyroscope reference systems which utilize plural force-balanced gyro rate sensors for sensing aircraft body rates about principal craft axes wherein gyro torquer feedback currents are maintained precisely proportional to sensed craft body rates and a precision digital count proportional thereto is desired. The invention incorporates a digital counting technique for providing a precision digital count proportional to the current supplied to the torquer. Such a count is generated by using a high frequency clock to quantize a lower frequency rectangular wave that has been pulse width modulated in proportion to the amplitude of the corresponding gyroscope error signal, the rectangular wave determining the magnitude of the zeroing feedback currents supplied to the gyro torquer coil. The one-way digital counter is synchronously enabled by the same rectangular wave and because it uses the same high frequency clock to provide a counter clocking frequency, that counter output, compared with a reference count, is the desired digital number corresponding to the currents supplied to the gyro torquer and hence corresponding to the sensed rate. The precision currents supplied to the gyro torquer are controlled by a VMOS power switching transistor circuit. Adverse effects of any transients associated with the rise and fall of the pulse width modulated rectangular wave currents, particularly at the positive and negative extremes, are eliminated by the use of pairs of guard band pulses at the beginning and end of the modulator duty cycle that are used predictably to control the rise and fall of the torquer currents and to blank the counter, thereby eliminating any count uncertainties at the switching times and assuring that erratic torquing transient current is not supplied to the torquer.

As described in detail in the referenced Allen patent, the torquer input signal is a series of 500 Hz current pulses having modulated pulse widths which vary from half positive and half negative to substantially full positive and full negative (within the 95% and 5% duty cycle due to the guard band pulses) in accordance with the gyro pick-off signal. It should be noted, however, that there is undesirable transformer-like coupling between the torquer coils and the pick-off coils which has a deleterious effect in producing a net torque to be applied to the gyro rotor. This net torque results from an erroneous pick-off signal being nulled and the action of the rotor suspension spring constants and auto-ejection (windage, etc.) phenomena which results in a torque being applied to the gyro that is not asked for and hence producing an undesired drift to the gyro which varies with rate inputs. It should be further noted that because of the close spacing between the torquer coils, if the trailing edges of the pulse width modulator rectangular waves of each channel of the gyro fell substantially at the same time, or very close to the same time, the changing magnetic fields of one pick-off coil would transformer couple into the coil of the other thereby producing a distorted pulse width waveform and an undesired bias drift in the presence of input rates. Accordingly, there is a need for an apparatus which minimizes the transformer-like coupling which occurs in flexure suspended gyroscopes of the type having pulse width modulated torquer signals.

SUMMARY OF THE INVENTION

In normal torque feedback operation of the prior art flexure suspended gyroscopes having pulse width modulated feedback torquer signals, there is objectionable induction, e.g., transformer-like coupling, between the pick-off coils and the torquer coils and transformer-like coupling between the torquer coils themselves. The transformer-like coupling produces an undesirable closely spaced bias drift output dependent upon input angular rates. The apparatus of the present invention provides means for eliminating or substantially eliminating such undesirable bias drift by minimizing the objectionable induction. In order to minimize the transformer-like coupling between the pick-off coils and the torquer coils, the pick-off excitation frequency is selected to be harmonically unrelated to the torquer coil frequency so that the difference between any integer multiple of the one frequency and the other frequency is on the order of a few hundred Hz or more. In order to minimize the transformer-like coupling between the closely spaced torquer coils themselves, means are provided whereby the trailing edges of the pulses of the pulse width modulated signals applied to the torquer coils are delayed one with respect to the other so as to prevent such transformer like coupling.

BRIEF DESCRIPTION OF THE DRAWINGS

FIGS. 1a and 1b together form a block diagram of a typical two axis, torque rebalanced rate gyroscope including the improved pulse width modulated torque rebalance system of the present invention and illustrate the basic components thereof and their electrical interconnections;

FIG. 3 is a block diagram of a clock circuit used in conjunction with the apparatus of FIG. 1.

DESCRIPTION OF THE PREFERRED EMBODIMENTS

The present invention is used for providing a precision measure of aircraft rates, operable in either low or high range modes, and for converting such measures into digital data for use in an aircraft digital strapped down attitude and heading reference apparatus. The rate gyroscopes of such apparatus may be dual axis, torque feedback, flexure suspended gyroscopes of the general kind described in the aforementioned patent disclosures, these documents disclosing the structure and operation of typical flexure rate gyroscopes. Such gyroscopes are characterized by having a gyroscopic rotor that is, in effect, freely suspended by flexure support members for spinning about a spin axis by means of an electric-motor-driven shaft journalled in the instrument casing. Universal tilting of the gyroscope rotor about a pair of axes perpendicular to the normal spin axis is permitted by the flexure support.

Figure 1A:
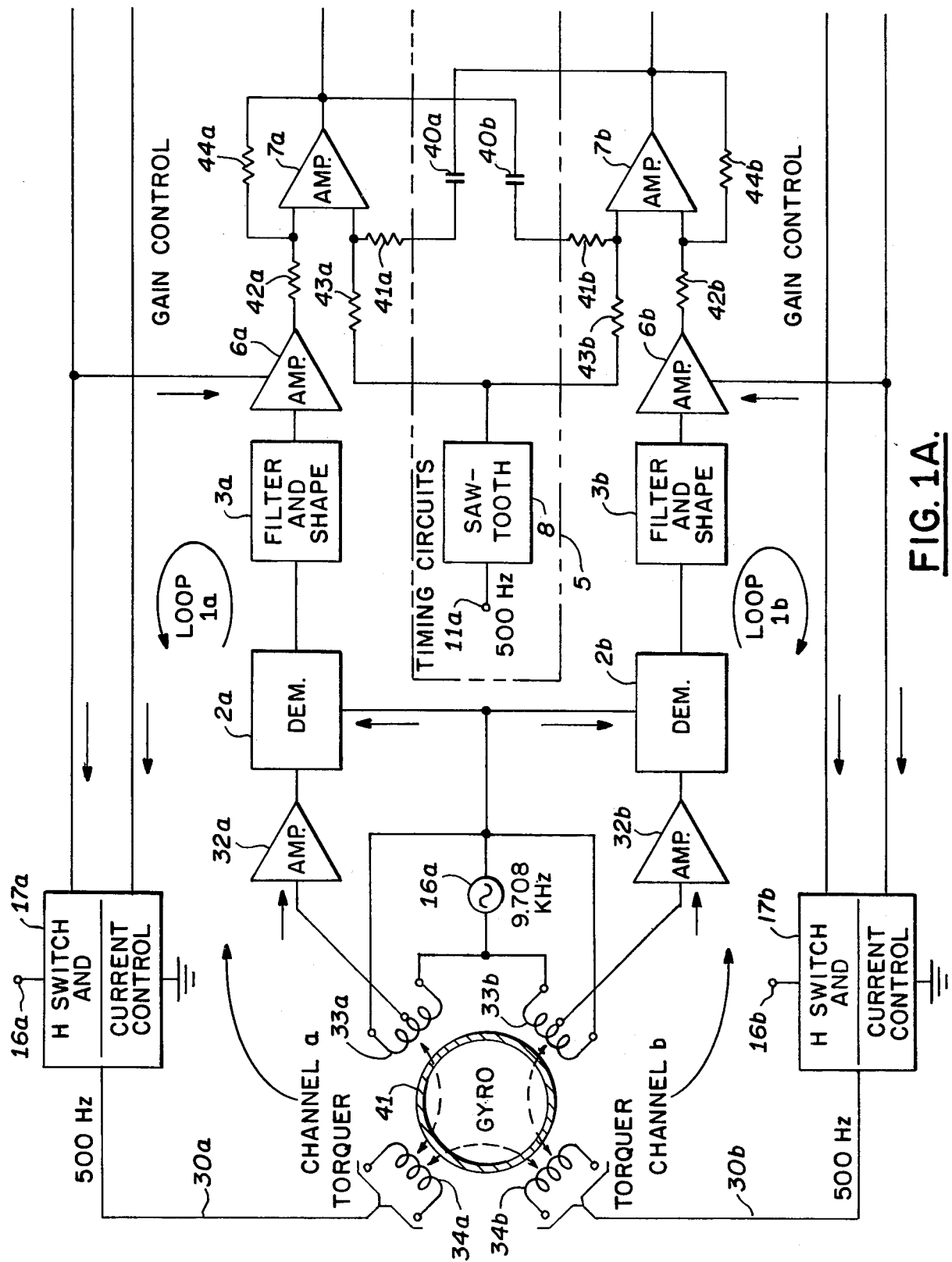

Such gyroscopic instruments are normally supplied with 90° spaced-apart pairs of inductive pick-offs for detecting angular displacement of the rotor with respect to its spin axis about mutually perpendicular inertial axes. Cooperating quadrature-spaced pairs of similarly disposed torquing coils are also normally present. In FIG. 1, the gyroscope and its coils are as a matter of convenience schematically illustrated, the pair of torquer coils being represented by respective single torquer coils 34a, 34b and the pair of inductive pick-offs by respective single pick-off coils 33a, 33b. Normally, the signal from pick-off coil 33a, for example, is kept at null by passing it through buffer amplifier 32a ultimately into torquer coil 34a to precess the gyroscope rotor 41 opposite to the precession caused by the input rate, thus keeping the axis of rotor 41 essentially aligned with the instrument and motor casing (not shown), which case is affixed to the craft. As described in the aforementioned patents, rotor 41 is flexibly mounted on a drive shaft and is spun by a motor inside of the instrument casing. In a similar manner, the signal from the quadrature pick-off coil 33b, is nulled through the gyro restoring loop including buffer amplifier 32b ultimately flowing into torquer coil 34b. It will be recognized, therefore, that the current driven into either torquer coil 34a or 34b is proportional to the rate at which the gyroscope casing is being rotated as the craft itself correspondingly rotates about its respective inertial axes. As the craft on which the gyroscope is fixed rolls, for example, the gyroscope rotor 41 is maintained substantially fixed with respect to its casing by precessing the rotor 41 in roll at the same rate that the craft is rolling. Consequently, craft roll rate, for example, can be precisely measured if the currents passing through the corresponding torquer coils 34a and 34b are accurately measured.

In what follows, it will be understood by those skilled in the art that the control systems respectively associated with the two inertial axes are functional duplicates. The gyroscope rotor position-restoring system including loop 1a uses tilt signals derived with respect to one axis by pick-off coil 33a to supply precession signals via lead 30a to the corresponding axis torquer coil 34a. Similarly, the gyroscope rotor restoring loop 1b uses tilt signals derived with respect to the quadrature axis by pick-off coil 33b to supply precession signals via lead 30b to the quadrature axis torquer coil 34b. It will be apparent that the two cooperative loops 1a and 1b are similar; therefore, only the loop 1a requires detailed discussion.

Figure 2:
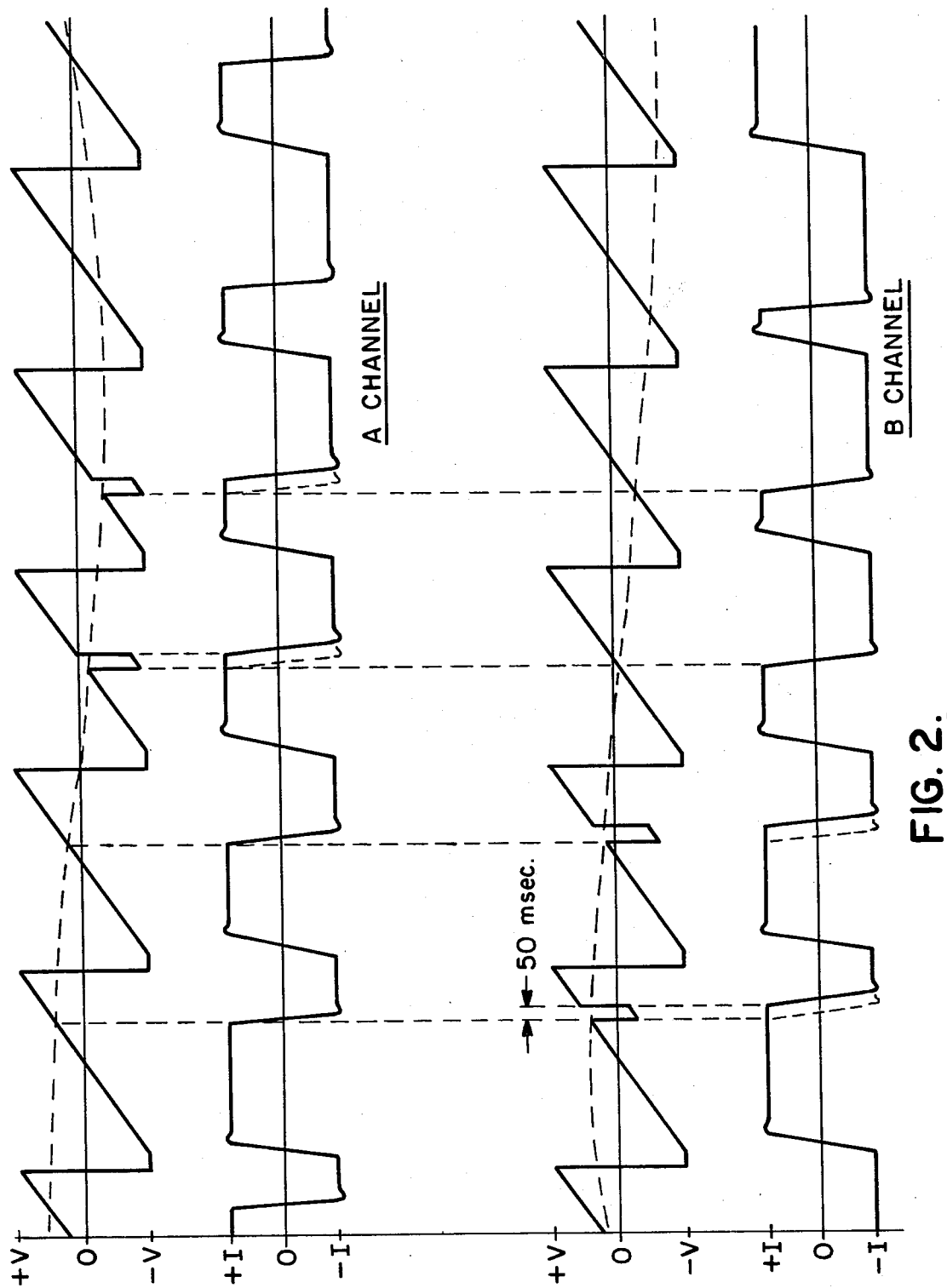
FIG. 2 presents graphical illustrations of pertinent electrical waveforms useful in explaining the operation of the invention.

FIG. 1 represents a simplified block diagram of an apparatus utilizing the present invention, discussion of which will be of material aid in the consideration of the details of the invention, as will be further presented in connection with FIG. 2. The error signal detected by pick-off 33a is coupled through buffer amplifier 32a to one set of inputs of demodulator 2a. Demodulator 2a, as well as demodulator 2b, is provided from a source 10a with a constant amplitude reference rectangular wave having a 9.708 KHz frequency, for example, which is also the excitation signal for pick-offs 33a, 33b. The gyro drive motor may be driven from a 400 Hz signal source (not shown). The variable polarity direct current output error signal of demodulator 2a is coupled to one input of amplifier 7a through a conventional filter and shaping network 3a, a variable gain amplifier 6a, and a resistor 42a. Similarly, the variable polarity, direct current output error signal of demodulator 2b is coupled to one input of amplifier 7b through a similar filter and shaping network 3b, a variable gain amplifier 6b, and a resistor 42b. If the axes of the gyroscopes are skewed with respect to the craft axes to enhance stability, as described in the above-noted application, it will be understood that the error signal outputs of demodulators 2a, 2b may first be subjected to a conventional cross axis compensation process involving filter and shaping networks not discussed because it is not necessarily pertinent to the present invention. With further respect to loop 1a, for example, the output of demodulator 2a is supplied as one input to amplifier 7a, an amplifier connected as a conventional comparator for comparing the first input level to the instantaneous level of a repetitive ramp or saw tooth voltage coupled to the second input of amplifier 7a via a resistor 43a from a source 8 yet to be described, which saw tooth wave, in the illustrated embodiment, has a 500 Hz repetition frequency and is supplied from timing circuits designated generally at 5.

The output of comparator 7a is coupled to a feedback resistor 44a, to a novel compensation circuit having capacitor 40b and resistor 41b, and to a pulse width modulator circuit 9a which is also supplied from a clock source (not shown), coupled to terminal 10b of the timing circuits 5. In the illustrated embodiment, the clock pulses are supplied at a 100 KHz rate, and are used to quantize the pulse width modulated square wave as will be described more fully. The output of circuit 9a serves two purposes. It is fed directly via lead 14a to a switching device 17a which will be identified herein as an H switch, which signal determines the conducting and non-conducting status of the individual elemental switches making up H switch 17a. The H switches 17a and 17b are supplied with suitable reference inputs 16a and 16b coupled to unidirectional voltage sources (not shown) which, under control of signals on lead 14a, provide a source of torquing currents to be applied to gyro torquer coils 34a and 34b.

The output of pulse width modulator 9a is also supplied to a counter and decoder 21a, whose second input is supplied with counter control pulses from counter control 20 of the timing circuit 5. Counter 21a cyclically counts the quantizing pulses corresponding to the loop 1a analog rate signal, holding such data for entry into a conventional digital computer (not shown), for example, coupled to the output of counter 21a, as controlled by the computer input interface. It will be noted that counter 21a is a simple one-way counter and that the clock pulses are counted only during the positive portion of the quantized square wave, as will be explained. Thus, a reference count on terminal 22a is supplied to the counter-decoder 21a which corresponds to one half the total count representing the saw tooth duty cycles, the measured count being subtracted from the reference count to provide a count proportional to the sensed aircraft rate. Alternatively, the decoder portion of the counter-decoder 21a is used to determine the rate range mode of operation of the invention.

In accordance with the present invention, guard band pulses from a source 15 synchronous with the 500 Hz duty cycle are provided to achieve precision control of the H switches 17a and currents supplied thereby as well as corresponding precision control of the quantizing pulses supplied to counter 21a. These pulses are used to compensate for inaccuracies otherwise associated with the finite rise and fall times and possible overshoot characteristics of the torquer currents and to assure that the pulses supplied to the counter faithfully represent the effective currents applied to the gyro torquer. The inclusion of the guard band pulses provides a time interval synchronous with the 500 Hz duty cycle during which it is determined by decoding circuits 21a responsive to the counter contents whether the control loop should switch to a high rate mode from a low rate mode or vice versa which, in turn, determines whether high or low current sources are switched by the H switch 17a. This is illustrated schematically in FIG. 1 by lead 19a connecting the counter-decoder 21a for supplying the high-low mode command to the H switch. Also, the high-low signal on lead 19a controls the gain of the gyro pick-off signal through variable gain amplifier 6a to assure that the over-all closed loop gain and loop stability remain the same in both modes of operation.

It will be apparent that the loop 1b associated with pick-off 33b and the torquer 34b is substantially identical in structure and operation to that associated with loop 1a, pick-off 33a and torquer 34a with respect to its cooperation with gyro rotor 41 and does not therefore require further detailed discussion. For example the H switch 17b is controlled by signals on lead 14b and 19b, the latter determining whether a low range or a high range torquing signal is applied to torquer coil 34b. Also, counter and decoder 21 cyclically collects counts corresponding to the loop 1b analog rate signal, accumulating such counts for rate range decoding and conveying the count to the digital computer or other data processor unit for conventional use in stabilization, control, navigation or guidance of the craft.

As noted, the low range is the normal mode. The diagonally opposed switch elements of the H switches are open and closed simultaneously and instantaneously in accordance with the respective positive and negative areas of the pulse width modulated rectangular wave as controlled by the signals on leads 14a and 14b. For example, if the input rate signal to comparator 7a is zero, the diagonally opposed switches of H switch 17a will be conducting and non-conducting for equal lengths of time. As a consequence, the net torque applied to the gyro torquer 34a is then zero.

As described in detail in the referenced Allen patent, the torquer input signal is a series of 500 Hz current pulses having widths which vary from half positive and half negative to substantially full positive and full negative (within the 90% and 10% duty cycle due to the guard band pulses) in accordance with the gyro pick-off signal. It has been discovered that when the frequency of the pick-off signal is an integer multiple of the torquer frequency there is harmonic, transformer-like coupling between the torquer coils 34a, 34b and the pick-off coils 33a, 33b. Moreover, the close proximity of the torquer coils 34a, 34b results in transformer-like coupling between themselves. Any harmonic, transformer like coupling from the torquer coils 34a, 34b to the pick-off coils 33a, 33b has a deleterious effect in producing a net torque to be applied to the gyro rotor 41 which results from an erroneous pick-off signal being nulled and the action of the rotor suspension spring constants and auto-ejection phenomena. Thus, a torque is applied to the gyro rotor 41 that is not asked for and hence produces an undesired drift of the gyro which varies with rate inputs. The harmonic, transformer-like coupling between the torquer coils 34a, 34b and the pick-off coils 33a, 33b as well as the transformer like coupling between the torque coils themselves is represented by dotted arrows in FIG. 1. It should be noted that the close proximity of the torquer coils 34a, 34b and of the pick-off coils 33a, 33b and the extremely small size of the flexure suspended gyroscope make it physically impossible to attempt shielding which could otherwise alleviate the transformer-like coupling.

The foregoing harmonic coupling between the torquer coils 34a, 34b and the pick-off coils 33a, 33b, however, may be effectively eliminated by selecting the frequency of either the torquer excitation signals or the pick-off excitation signals such that there is no effective harmonic relationship between them. In the present embodiment the pick-off excitation signal is selected to have a frequency that is a desired non-integer multiple of the frequency of the torquer excitation signal. Preferably, the difference between any integer multiple of the torquer frequency and the pick-off frequency, is on the order of a few hundred Hz or more.

The operation of the systems of FIG. 1 may, therefore, be governed by a high frequency master clock 50 of FIG. 3 and the various frequencies required by the various components of the system are derived by dividing down the master clock frequency using conventional divider circuits 51, 52. As shown in FIG. 3, the master clock 50 operates at 4 MHz and the torquer frequency of 500 Hz is derived by dividing by 8000 with divider 51. It should be noted that in the prior art Allen patent the frequency of the pick-off excitation signal is 10 KHz, which is an integer multiple of the torquer frequency of 500 Hz. In the present invention, however, the frequency of the pick-off excitation signal is selected to be approximately 9.708 KHz, derived by dividing the 4 MHz master clock frequency by 412 with divider 51. It should be further noted that the 9.708 KHz is also used as the reference frequency for the demodulators 2a and 2b. In the prior art the harmonic coupling of the 500 Hz torquer square wave into the demodulators 2a and 2b caused the pick-off output signal to produce a bias in the demodulator output, which, through the feedback loop tended to drive its output to zero. This nulling of the demodulator output produced the corresponding steady torque on the gyro and the resulting bias drift which was dependent upon input angular rate. The selection of 9.708 KHz as the pick-off and demodulator excitation frequency, however, eliminates these undesired bias drift effects associated with induction or transformer coupling between the torquer coils 34a, 34b and the pick-off coils 33a, 33b.

As mentioned above, there is also transformer-like coupling between the torquer coils 34a, 34b through the rotor shell as well as through the gas. This second source or transformer coupling may be attributed to the close proximity of the torquer coils 34a, 34b and the precisely shaped pulse width modulated torquer signals. As discussed in the Allen patent, the pulse-width modulated feedback or rebalance torquer signals are essentially very precisely shaped rectangular wave current pulses having their pulse widths varied between 5% and 95% of the duty cycle in accordance with the gyro pick-off signals through the H switches 17a, 17b. Further, since these pulses are derived from common logic circuitry, the leading edges of the pulses applied to each torquer coil 34a, 34b always rise precisely and simultaneously. However, their trailing edges will fall at variable times dependent upon the pick-off signals.

It should be pointed out that the A channel pick-off 33a energizes the A channel torquer 34a and that the B channel pick-off 33b energizes the B channel torquer 33b. However, in accordance with conventional gyro precession theory, it should be recognized that in order to null a pick-off signal produced by tilt of the rotor 41 about the x-axis of the gyro, the rotor must be torqued about the gyro y-axis.

Some of the time the A and B current pulse widths will be quite different, that is the pulse trailing edges will not fall at the same time or their falling edges will not overlap timewise. Therefore, when for example, the B torquer rectangular wave trailing edge is falling, the A torquer rectangular wave is fully positive or fully negative. The changing current of the B torquer coil 34b will not, in accordance with the classic transformer theory, couple into the A torquer coil 34a since it is already drawing its maximum current. However, under other combinations of aircraft roll and pitch angular rates, the trailing edges of the A and B rectangular waves will fall very closely together or overlap. When this occurs, the magnetic fields produced by current changes in the torquer coils 34a, 34b will cross couple from one torquer coil to the other, inducing currents in one or the other thereof which are not compensated for by equal but opposite currents induced during the rising edges of the pulses and therefore introducing gyro bias drift rates. That is, the shapes of the pulses are distorted. The present invention overcomes these undesirable torquer coil cross coupling effects and therefore eliminates any resulting gyro bias drift dependent upon input angular rates. Basically this is accomplished by deliberately preventing both trailing edges from ever occurring at or about the same time. This is accomplished by detecting the initiation of the trailing edge transition of one of the pulses and immediately delaying the initiation of the transition of the other. The amount of the delay is approximately equal to the normal pulse trailing edge transition time.

FIG. 1 illustrates one embodiment of the novel pulse width modulation compensation circuits which are added to the prior art torque rebalance system and FIG. 2 illustrates the pulse width modulated waveforms associated with the addition of these circuits. As shown in FIG. 1, and as described in the prior art Allen patent, a sawtooth voltage wave is applied to comparator amplifiers 7a and 7b to which is also supplied the demodulated gyro pick-off signals. Considering only the gyro A channel for the moment and referring to FIGS. 1 and 2, it is assumed that the aircraft is experiencing a rate of turn in a direction to cause a signal to be produced by pick-off 33a. Demodulator 2a and amplifier 6a operate in response to this signal to produce a finite positive d.c. signal at the upper input of high gain comparator amplifier 7a. When the sawtooth wave voltage at the lower input of amplifier 7a increases to a value equal to the pick-off signal, the amplifier 7a outputs a large switching voltage to the pulse width modulator 9a. As described in the Allen patent, this results in a proportional current phase width signal (at 500 Hz frequency) to the A channel torquer 34a through H switch 17a, and a resultant proportional torque on the gyro rotor 41, and a resultant precession thereof in a direction to reduce the pick-off signal. As the error signal reduces toward zero, the positive pulses widths get progressively narrower until at zero pick-off signal, the torquer pulses are again half on in one direction and half on in the opposite direction resulting in zero net torque on the gyro rotor 41. The same operation takes place when the aircraft experiences a turn rate about the gyro A axis. It should be noted that both torquer signals are derived from a common source 8 of sawtooth reference voltages.

As described above, it has been discovered that when the trailing edges of the 500 Hz torquer current pulses fall at about the same time; i.e., there is an overlap in the pulse fall times, the first-to-fall trailing edge current to either torquer coil 34a, 34b couples into the coil of the other torquer through transformer type; i.e., mutual inductance, coupling so that when its trailing edge current begins to fall, the coupled current modifies the latter and thereby effectively increases or decreases the net current therein. Conversely, the second trailing edge current modifies the shape of the first-to-fall edge by mutuality. Clearly a member a such augmented pulse cycles will produce or result in an erroneous net torque on the gyro rotor 41 and an undesired bias drift error. This phenomenon is especially pronounced during low input angular rates about one or both axes up to about ±5°/sec.

The present invention prevents this objectionable coupling by not permitting the trailing edges to overlap. Referring again to FIGS. 1 and 2, it will be recalled that the comparator amplifiers 7a and 7b responsive to the gyro pick-off signal voltages and sawtooth wave voltages are conventional high gain devices and act essentially as switches which supply at their outputs a relatively large negative voltage whenever the sawtooth wave signal is more positive than the pick-off error signal. In accordance with the present invention, this d.c. voltage from the output of either comparator 7a, 7b of either channel is crossfed to the sawtooth wave input of the other channel through a coupling circuit means, such as a pulse-forming network. Preferably, the coupling comprises a derivative network including a series connected capacitor-resistor such as capacitors 40a, 40b and resistors 41a, 41b. The coupling circuit means is designed so as to produce what may be termed a blanking pulse having a time duration substantially equal to the normal fall time of the variable width square wave trailing edge.

The effect of this pulse crossfeed between the gyro channels is illustrated schematically in FIG. 2. Assuming the A channel comparator amplifier 7a fires first (due to circuit tolerances and normal system operation, the probability that the two comparators will fire at precisely the same instant is exceedingly small), its d.c. output is applied through its cross-axis network, the resulting d.c. pulse output therefrom being applied to the sawtooth wave input of amplifier 7b in a sense to decrease the sawtooth wave voltage at the comparator input for the duration of the pulse. Therefore, the comparator amplifier 7b output is delayed and in turn the fall of its resulting current rectangular wave trailing edge is inhibited preventing the changing current of the A channel rectangular wave from coupling into the B channel torquer coil 34b. This same operation takes place where the B channel wave trailing edge is first to occur. It will be appreciated by those skilled in the art that the waveforms of FIG. 2 are highly exaggerated and in practice the gyro pick-off signal will not vary nearly as rapidly relative to the sawtooth wave frequency as illustrated. In one embodiment, for example, the sawtooth wave varies at 500 cycles per second while the gyro signal normally changes at a few cycles per second.

It will be appreciated that the invention is disclosed in connection with a preferred embodiment. However, other embodiments may be considered useful by those skilled in the art. For example, instead of creating the blanking pulse by analog techniques, it may be created by digital counter techniques. The output of the comparator amplifier may initiate a digital counter which counts through a predetermined number of clock cycles to produce the desired delay time period. Also, instead of the A and B channel pulse width modulators being controlled synchronously from a common sawtooth source, both channels may be controlled by suitably phase-displaced sawtooth waves of identical frequency.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. In a gyroscopic reference system for navigable craft including at least one torque rebalanced, two-degree-of-freedom gyroscope comprising a free rotor adapted to spin about a spin axis and to freely tilt about a pair of mutually perpendicular sensing axes normal to said spin axis in response to turning motion of said craft, pick-off coil means having an a.c. reference source connected thereto and coupled with said rotor for detecting rotor tilt about said sensing axes and supplying corresponding a.c. electric signals in accordance therewith, and torquer coil means also coupled with said rotor for imparting torques thereto in accordance with a.c. electric currents proportional to said pick-off signals for reducing said pick-off signals to zero whereby said torquer currents are proportional to said craft turning motion; apparatus for compensating for any electromagnetic coupling between the torquer coils effective about adjacent axes comprising, pulse width control means including comparator means responsive to said pick-off signals and a sawtooth reference voltage for supplying corresponding substantially rectangular wave current pulse trains to respective ones of said torquer coil means, each of said square waves of said pulse trains having one edge thereof variable in time of occurrence in accordance with the amplitude of said pick-off signals, and circuit means responsive to each of said comparator means for preventing said time varying one edge of said respective square wave pulse trains from substantially coinciding.

2. The apparatus as set forth in claim 1 wherein an integer multiple of the frequency of said square wave torquer pulse trains differs from the frequency of said pick-off reference source by a substantial amount whereby to prevent electromagnetic coupling between adjacent pick-off coils and torquer coils.

3. The apparatus as set forth in claim 1 wherein said circuit means includes responsive to the output of that comparator means which occurs first in time for delaying the output of the other of said comparator means for a predetermined time period.

4. The apparatus as set forth in claim 3 wherein said circuit means includes a capacitor means.

5. The apparatus as set forth in claim 3 wherein said circuit means includes a resistance-capacitance network means.

6. The apparatus as set forth in claim 5 wherein said resistance-capacitor network includes series connected capacitor and resistance means.

* * * * *